US007189667B1

(12) United States Patent
Mans et al.

(10) Patent No.: US 7,189,667 B1
(45) Date of Patent: Mar. 13, 2007

(54) SPONGE TOWEL BASED ON CELLULOSE AND A METHOD FOR PRODUCING THE SAME

(75) Inventors: Leo Mans, Mainz (DE); Klaus-Dieter Hammer, Mainz (DE)

(73) Assignee: Kalle GmbH & Co. KG, Wiesbaden (DE)

( * ) Notice: Subject to any disclaimer, the term of this patent is extended or adjusted under 35 U.S.C. 154(b) by 0 days.

(21) Appl. No.: 09/554,733

(22) PCT Filed: Nov. 25, 1998

(86) PCT No.: PCT/EP98/07599

§ 371 (c)(1),
(2), (4) Date: May 19, 2000

(87) PCT Pub. No.: WO99/27835

PCT Pub. Date: Jun. 10, 1999

(30) Foreign Application Priority Data

Dec. 3, 1997 (DE) ................................ 197 53 546

(51) Int. Cl.
*D04H 1/00* (2006.01)
*D04H 3/00* (2006.01)
*B32B 29/00* (2006.01)
*B32B 5/02* (2006.01)

(52) U.S. Cl. ......................... 442/414; 442/63; 442/123

(58) Field of Classification Search .................. 264/49; 442/1, 78, 79, 414, 63, 123; 15/244.1; 156/306
See application file for complete search history.

(56) References Cited

U.S. PATENT DOCUMENTS 2,179,181 A * 11/1939 Graenacher et al. .......... 106/40
4,130,683 A * 12/1978 Michel et al. .............. 428/194
4,145,532 A * 3/1979 Franks et al. ................. 536/56
4,940,631 A * 7/1990 Colin et al. .............. 428/309.9
5,626,810 A * 5/1997 Zikeli et al. ................ 264/187
5,906,780 A * 5/1999 Hausdorf et al. ............. 264/49
6,007,750 A * 12/1999 Firgo et al. .................... 264/54
6,129,867 A * 10/2000 Chevalier ..................... 264/28

FOREIGN PATENT DOCUMENTS

DE 29618058 U1 * 6/1997
EP 0712 889 5/1996
EP 0712889 A2 * 5/1996
FR WO 97/42259 11/1997
FR WO 97/422569 11/1997
WO 95/11261 * 5/1995
WO 97/23552 * 7/1997
WO 97/422 * 11/1997
WO 97/42259 * 11/1997
WO 98/28360 * 7/1998

OTHER PUBLICATIONS

Chevalier et al WO 97/42259, Translation, USPTO.*

* cited by examiner

*Primary Examiner*—N. Bhat
(74) *Attorney, Agent, or Firm*—Susan E. Shaw McBee

(57) ABSTRACT

The invention relates to a sponge cloth based on cellulose and having an internal reinforcement, obtainable by the amine oxide process. In the process, a solution of cellulose in an aqueous amine oxide is first produced, which is then mixed with at least one pore former and fibers. The mixture is spread on a conveyor belt which is then guided through a coagulating bath comprised of a diluted aqueous amine oxide solution whose temperature is high enough such that the pore former melts and is dissolved out. Remaining amine oxide is washed out. After subsequent drying the sponge cloth layer is end-itemed. Contrary to the viscose process polymer degradation does not occur in the inventive process which results in a sponge cloth having an improved mechanical stability. A plastic net can replace the fiber reinforcement. The process is especially ecological and economical. The sponge cloth is highly water-absorbent and can be used for household or industrial purposes, especially for cleaning and decontaminating purposes.

21 Claims, No Drawings

SPONGE TOWEL BASED ON CELLULOSE AND A METHOD FOR PRODUCING THE SAME

BACKGROUND OF THE INVENTION

1. Field of the Invention

The invention relates to a cellulose-based sponge cloth which has been provided with an internal reinforcement and to a process for producing same. The sponge cloth is highly water-absorbent and is useful in the household and industry for various cleaning and decontaminating purposes.

2. Description of Related Art

Sponge cloth production by the viscose process is well known. First, pulp, especially wood pulp, is converted with sodium hydroxide and carbon disulfide into an alkaline cellulose xanthate solution known as viscose. At the same time, cotton noils are degreased with dilute, detergent-containing NaOH. The ripened viscose solution is then mixed with cotton fibers. This is generally done with the aid of a kneader. Instead of cotton fibers it is also possible to use viscose fibers as internal reinforcement. Glauber's salt (=sodium sulfate decahydrate) is then added and likewise mixed in uniformly. This sponge cloth raw material is then applied to a support, for example a foraminous endless belt, to whichever depth is desired. It is also possible to apply a mixture of viscose solution and Glauber's salt to a plastic support material, for example a net of polyethylene terephthalate (PET). The regeneration of the cellulose then takes place in a heated, alkaline coagulation bath. It can also be carried out in an acidic medium, for example dilute sulfuric acid. In the process, the internal reinforcement becomes integrated into the sponge cloth body.

Glauber's salt has a very low melting point. It therefore melts in the coagulation bath and is dissolved out. The disappearing salt crystals leave pores and voids behind. Finally, the sponge cloth is washed out to rid it of salt residues and adhering reaction products. After drying, it is cut into narrow lengths, which in turn are rolled up. The roll material can then be end-itemed into cloths of the desired size.

However, the viscose process is technically very complicated and costly. In addition, appreciable efforts are needed if it is not to impact adversely on the environment. An unpleasant concomitant of the viscose process is for example the formation of foul smelling hydrogen sulfide. A sponge cloth produced by the viscose process still contains residues of $CS_2$ or $H_2S$, which have to be expensively washed out. In addition, in the course of the several hours of ripening of the viscose solution, the cellulose polymer chains are more or less degraded. This leads to a pronounced broadening of the distribution curve of the degree of polymerization (DP) of the cellulose chains. Even the use of a cellulose starting material having the same degree of polymerization therefore does not consistently guarantee the same post-regeneration result. The mechanical stability of the sponge cloth will then moreover fluctuate, inter alia according to the degree of polymerization.

WO 97/42259 discloses sponge cloths containing reinforcing fibers and processes for producing them. The fibers can be added as additive or else originate from the cellulosic starting material if this is only incompletely dissolved. The dissolving of the cellulose material, which is pretreated with steam under high pressure, is generally effected using strongly alkaline, aqueous solutions, preferably with NaOH solutions. As well as a pore former, a blowing agent is additionally used as well at all times, for example a surfactant such as sodium lauryl sulfate.

EP-A 712 889 discloses fiber-containing cellulose/amine oxide solutions for producing mainly fibers, papers, films and food casings. Sponges are mentioned as well, but not sponge cloths.

WO 97/23552 describes cellulose sponges (not sponge cloths) and processes for producing them. These sponges are produced from a cellulose/NMMO solution which is mixed with a pore former and a blowing agent. The mixture is subsequently exposed to conditions under which the blowing agent decomposes, causing the cellulose solution to foam. This produces the large pores which are typical of sponges and which are undesirable in a sponge cloth.

SUMMARY OF THE INVENTION

It is an object of the present invention to use an economically and ecologically better process to produce sponge cloth which contains no or at least distinctly less troublesome impurities and has a consistently high quality.

This object is achieved by a sponge cloth which is obtainable by the amine oxide process. This process utilizes solutions of cellulose in a mixture of an N-oxide of a tertiary amine and water. A particularly suitable N-oxide is N-methylmorpholine N-oxide (NMMO).

DETAILED DESCRIPTION OF A PREFERRED EMBODIMENT

The amine oxide process is well known. Hitherto this process was used to produce especially cellulose-based fiber or film. AT-B 402 932 (Application No. 95-02100) describes the production of cellulose sponge from a solution of cellulose in a tertiary amine oxide mixed with a pore former and a blowing agent. This mixture is exposed to conditions where the blowing agent decomposes to form gaseous products and so causes a foam to form with relatively large voids. The foamed mixture is then contacted with water to precipitate the cellulose. The amine oxide can be washed out of the resulting sponge using water. However, blowing agents are completely unsuitable in the production of sponge cloth, since they would provide neither the requisite mechanical stability nor the necessary abrasion resistance.

The sponge cloth of the invention can be produced from a raw material comprising cellulose dissolved in a mixture of an N-oxide of a tertiary amine and water, a pore former and a fiber reinforcement. The N-oxide is preferably N-methylmorpholine N-oxide. The raw material thus produced is then applied via a die, preferably a slot die, to a support belt. The (preferably foraminous) support belt then transports it into a spin bath. This bath comprises a 5 to 50% by weight aqueous amine oxide solution, preferably a 5 to 50% by weight aqueous NMMO solution. The spin bath causes the cellulose to precipitate and solidify. The sponge cloth web thus produced is then washed out with water and dried.

In a further embodiment, a material which includes cellulose dissolved in NMMO and water and a pore former is applied to a net-shaped material, for example a polyester net, from both sides. The net thus coated is then passed through spin and wash baths as described. However, an internal reinforcement is required in either case. In a cellulose sponge, in contrast, the internal reinforcement plays only a minor role in favor of the water absorption capacity.

The sponge cloth produced by the process of the invention has—under otherwise identical general conditions—a higher mechanical stability and hence better breaking strength than the sponge cloth produced by the viscose process. The reason is primarily that the inevitable polymer degradation in the ripening of the viscose solution does not occur in the process of the invention. The molecular weight distribution curve of the cellulose product of the invention is virtually identical to the distribution curve of the cellulose raw material used in the process. Since, moreover, no polymer degradation occurs if a prolonged period elapses between the preparation of the solution and its coagulation, consistent quality is ensured. The sponge cloth of the invention is virtually free of undesirable impurities such as hydrogen sulfide and carbon disulfide. It is capable of absorbing and retaining a large amount of water. It is, moreover, generally naturally degradable and can therefore be composted without problems.

The amine oxide used in the production of the sponge cloth is virtually quantitatively recoverable and—after appropriate concentrating—reusable. It is therefore advantageous for the amine oxide in the sponge cloth raw material to be identical to the amine oxide in the spin bath and in the subsequent baths. The remaining wastewater contains hardly any residuals and it therefore has only a low chemical oxygen demand (COD).

The pore former in the process of the invention is preferably an inorganic salt which is readily water-soluble. Useful are in particular alkali metal, alkaline earth metal and ammonium salts of inorganic acids, such as chlorides (specifically NaCl and KCl, but not $MgCl_2$), sulfates (specifically $Na_2SO_4$ and $MgSO_4$), phosphates (specifically $Mg_3(PO_3)_2$, silicates (specifically $Mg_2[SiO_4]$=forsterite) and carbonates (specifically $Na_2CO_3$, $CaCO_3$ and $(NH_4)_2CO_3$). The diameter of the salt crystals is generally up to 2.5 mm, preferably up to 2.0 mm. But only about ⅕ of the crystals should have a diameter of less than 0.3 mm, or the sponge cloth obtained will have a reduced water absorption capacity. The pore former fraction is generally 30 to 90% by weight, preferably 70 to 85% by weight, based on the total weight of the sponge cloth raw material.

A suitable source of cellulose is pulp, especially ground wood pulp. The cellulose used in the process of the invention should have a degree of polymerization DP of 300 to 1600, preferably 400 to 600. Mixing the cellulose with the aqueous NMMO (water fraction about 40% by weight) will initially result in the formation of a suspension. The suspension is then stirred and heated (about 70 to 120° C., preferably 85 to 95° C.) under reduced pressure (preferably about 40 to 200 mbar) to remove some of the water. The water fraction decreases from about 40% by weight to about 7 to 12% by weight, and the suspension changes into a virtually homogeneous solution. The refractive index of the solution is about 1.4910 to 1.4930. The solution contains 5 to 20% by weight, preferably 10 to 15% by weight, of dissolved cellulose. The viscosity of this solution is about 1500 Pa s. When freshly prepared, the solution is only weakly alkaline (pH about 7.8). On standing, however, the NMMO decomposes into basic products which raise the pH. The preparation of the cellulose solution is described inter alia in WO 97/31970. The cellulose solution is then mixed with the other components, advantageously in a kneader. In the sponge cloth raw material thus produced, the cellulose fraction is 0.5 to 10.0% by weight, preferably 1.0 to 5.0% by weight, based on the total weight of the raw material.

The fiber reinforcement comprises natural fibers, preferably cotton, hemp, flax or viscose fibers produced by the NMMO process (lyocell). Fiber length is 5 to 50 mm, preferably 10 to 30 mm. The fibers are generally pretreated to improve the compatibility with the NMMO solution. The fiber fraction is 5 to 50% by weight, preferably 10 to 40% by weight, based on the dry weight of the sponge cloth.

Sponge cloths are relatively brittle in the dry state. To remedy this disadvantage, plasticizing substances may be added to the sponge cloth raw material. Particularly useful plasticizers are washed out only very slowly, if at all, and therefore retain their effectiveness ideally over the entire use period. Useful plasticizers are in particular starch and starch derivatives, low molecular weight cellulose derivatives, polyvinyl alcohol, vinylpyrrolidone/vinyl alcohol copolymers, polyvinyl acetate, vinyl methyl ether/maleic anhydride copolymers (®Gantrez), urea, hexamethylenediamine, carrageenan, alginates (especially sodium alginate), guar and guar derivatives [especially cationic guar derivatives (®Meyprofloc), carboxymethylhydroxypropyl guar (®Jaguar CMHP) and highly substituted carboxymethyl guar (®Jaguar CMHS)], galactomannan, xanthan gum, polysaccharides with side chains (®Rhodigel), heteropolysaccharides (®Rhodicare), alkylpolyethoxyammonium lactate (®Genamin), polyester interpolymers (®Cassapret), phosphoric esters (®Hostaphat), condensation products based on saturated or unsaturated fatty acids of various chain lengths and taurine, methyltaurine or hydroxyethanesulfonic acid, N-cocoylglutamic acid monosodium salt (®Hostapon), fatty alcohol polyglycol ether (®Genapol), phthalic diesters or quaternary nitrogen compounds (®Leomin). The plasticizer fraction is 1 to 15% by weight, preferably 2 to 10% by weight, based on the dry weight of the finished sponge cloth.

The sponge cloth of the invention may finally also be impregnated with biocidally—especially fungicidally, bacteriocidally and/or algicidally—active substances (cf. DE-U 296 18 058). A biocidal finish is particularly sensible when moistened sponge cloths are likely to remain for a prolonged period inside a polymeric film pack. Particularly preferred biocides are isothiazolone, benzisothiazolone and benzimidazole derivatives. Fungicidal or bacteriocidal activity is also exhibited by cationic, surface-active ammonium salts having long-chain, saturated or unsaturated $(C_6–C_{24})$alkyl groups, especially $(C_8–C_{18})$alkyltrimethylammonium chlorides, di$(C_{10}–C_{18})$alkyldimethylammonium chlorides or alkylbenzyldimethylammonium chlorides. As well as the chlorides of tertiary ammonium compounds, however, bromides, acetates, propionates, sorbates, benzoates or sulfates may also be used. Such compounds are disclosed in EP-A 286 009 for example. Bacteriocidal activity is finally also exhibited by dipyridyl sulfide and its bis-N-oxide or 1-alkyl- and 1-alkenylpyridinium salts (for example 1-laurylpyridinium chloride). Similarly, aluminosilicates or zeolites (®Zeomic from Shinanen Zeomic Co. Ltd., Japan, CAS No. 1318-02-1) in which silver or copper has been incorporated exhibit a biocidal effect. The same effect can also be achieved by impregnating with glycerol or propylene glycol.

Finally, the sponge cloths of the invention may also be moistened. A particularly useful moistener is a 2 to 8% by weight magnesium chloride solution which may additionally include 0.2% by weight of a scent, for example of an oil having a citrus, pine or similar scent, in emulsified form.

The invention also provides the process for producing a sponge cloth which is based on cellulose and has an internal reinforcement, which comprises the steps of:

(a) providing a mixture which includes cellulose dissolved in the N-oxide of a tertiary amine and water and also at least one pore former and fibers, (b) spreading the mixture onto a transportation belt, (c) treating the layer with a coagulation bath comprising a dilute aqueous amine oxide solution to dissolve out the pore former, (d) washing the remaining amine oxide out, (e) drying the sponge cloth web and (f) end-iteming it.

The sponge cloth raw material is advantageously produced by mixing the individual ingredients in a kneader. It is advantageous to mix in the pore former and any color pigment last. The spreading of the raw material on the transportation belt may be effected for example with the aid of a slot die.

By end-iteming a person skilled in the art will understand primarily the operation of cutting the moist or dry sponge cloth length to the desired size and packing with or without printing.

In one variant of the process according to the invention, steps (a) and (b) are modified. Step (a) dispenses with the fibers; instead, step (b) comprises applying the mixture via a die in a thin layer to both sides of a plastic net.

The examples hereinbelow illustrate the invention. Percentages are by weight, unless otherwise stated.

EXAMPLE 1

510 g of ground wood pulp (®Cellunier F from Rayonier) having an average degree of polymerization of 535 (determined by the cuoxam method) was steeped up in 5087 g of a 60% NMMO solution. The pH of the steep was then adjusted to 11 with NaOH. The steep was then stirred and heated under reduced pressure with increasing temperature to distill off water until the NMMO content was 87.7%, based on the total weight of water and NMMO, and the monohydrate was present (discernible from a refractive index of 1.4820). During this phase, which lasted about 4 hours, the vacuum was maintained at 1.333 to 2.133 kPa (10 to 16 Torr). After a further 2 to 3 hours of stirring at about 85 to 95° C., all the pulp had gone into solution.

In order that less water may evaporate, the vacuum was adjusted to about 26.66 kPa (200 Torr) during this period. The refractive index then settled down at about 1.4910 to 1.4930, which corresponds to a water content of 7.5 to 9%.

The solution thus prepared was admixed with 850 g of cotton wetted with an appropriately heated solution consisting of caustic soda and a degreaser and kneaded. In a second kneading process, the pulp-cotton solution was admixed with 30 kg of sodium chloride pore former and 3 g of a blue pigment while maintaining a temperature ensuring the requisite fluidity.

The sponge cloth obtained had the following properties:

| Properties | Unit | Value | Standards |
|---|---|---|---|
| Basis weight | $g/m^2$ | 263 | DIN 53 854 (absolutely dry) |
| Thickness in moist state | mm | 5.3 | DIN 53 855, 0.02 $N/cm^2$ |
| Thickness in dry state | mm | 2.4 | DIN 53 855, 0.2 $N/cm^2$ |
| Water absorption capacity | $l/m^2$ | 5.4 | |
| Veslic test | Rub cycles | 98 | |
| Abrasion | $g/m^2$ | 41 | DIN 53 528 |
| Wet ultimate tensile stress strength | N/15 mm | 25 | DIN EN ISO 527-1 |
| Wet ultimate tensile stress extension | % | 19 | DIN EN ISO 527-1 |

EXAMPLE 2

Example 1 was repeated except that the amount of the pore former (NaCl) was reduced to 25 kg. The sponge cloth obtained had the following properties:

| Properties | Unit | Value | Standards |
|---|---|---|---|
| Basis weight | $g/m^2$ | 380 | DIN 53 854 (absolutely dry) |
| Thickness in moist state | mm | 5.9 | DIN 53 855, 0.02 $N/cm^2$ |
| Thickness in dry state | mm | 2.8 | DIN 53 855, 0.2 $N/cm^2$ |
| Water absorption capacity | $l/m^2$ | 6.3 | |
| Veslic test | Rub cycles | 112 | |
| Abrasion | $g/m^2$ | 38 | DIN 53 528 |
| Wet ultimate tensile stress strength | N/15 mm | 30 | DIN EN ISO 527-1 |
| Wet ultimate tensile stress extension | % | 25 | DIN EN ISO 527-1 |

What is claimed is:

1. A process for producing a sponge cloth which is based on cellulose and has been provided with an internal reinforcement, which comprises (a) providing a which includes cellulose dissolved in the N-oxide of a tertiary amine and water and also at least one pore former and fibers, but not blowing agent, (b) spreading the mixture onto a transportation belt, (c) passing the layer through a coagulation bath comprising a dilute aqueous amine oxide solution to dissolve out the pore former, (d) washing the remaining amine oxide out, (e) drying the sponge cloth web and f) end-iteming it (g) wherein said mixture is not exposed to conditions where a blowing agent decomposes to form gaseous products.

2. The process of claim 1, wherein the N-oxide of a tertiary amine is N-methylmorpholine N-oxide.

3. The process of claim 1, wherein the coagulation bath comprises a 5 to 50% by weight aqueous amine oxide solution.

4. A process according to claim 3, wherein the weight is 5 to 50% of an aqueous NMMO solution.

5. The process of claim 1, wherein the fibers fraction is 5 to 50% by weight, based on the dry weight of the sponge cloth.

6. The process of claim 1, wherein the pore former is an alkali metal, alkaline earth metal or ammonium salt of an inorganic acid.

7. The process of claim 6, wherein the pore former is sodium sulfate or magnesium sulfate.

8. The process of claim 1, wherein the pore former fraction is 30 to 90% by weight, based on the total weight of the sponge cloth raw material.

9. A process according to claim 8, wherein the weight is 70 to 85%.

10. The process of claim 1, wherein the cellulose fraction is 0.5 to 10.0% by weight, based on the total weight of the sponge cloth raw material.

11. A process according to claim 10, wherein the weight is 1.0 to 5.0%.

12. The process of claim 1, wherein the mixture additionally includes at least one plasticizer and/or at least one biocidally active agent.

13. The process of claim 1 wherein the plasticizer fraction is 1 to 15% by weight, based on the dry weight of the finished sponge cloth.

14. A process according to claim 13, wherein the weight is 2 to 10%.

15. A process according to claim 1, wherein the fibers fraction is 10 to 40% by weight, based on the dry weight of the sponge cloth.

16. A process for producing a sponge cloth which is based on cellulose and has an internal reinforcement, which comprises (a) providing a mixture which includes cellulose dissolved in the N-oxide of a tertiary amine and water and also at least one pore former, (b) applying the mixture to both sides of a polymeric net, (c) passing the layer through a coagulation bath comprising a dilute aqueous amine oxide solution to dissolve out the pore former, (d) washing the remaining amine oxide out, (e) drying the sponge cloth layer and (f) end-iteming it (g) wherein said mixture is not exposed to conditions where a blowing agent decomposes to form gaseous products.

17. A sponge cloth having a density of at least 109.6 kg/m 3 which is based on cellulose and has been provided with an internal reinforcement, which has been obtained by an amine oxide process without being exposed to conditions where a blowing agent decomposes to form gaseous products and so as to cause a foam.

18. The sponge cloth of claim 17, wherein the amine oxide used in the process is N-methylmorpholine N-oxide.

19. The sponge cloth of claim 17, wherein the internal reinforcement comprises cotton fibers, viscose fibers or a polymeric net.

20. The sponge cloth of claim 17, including at least one plasticizer.

21. The sponge cloth of claim 17, impregnated with a biocidally active agent.

* * * * *

UNITED STATES PATENT AND TRADEMARK OFFICE

CERTIFICATE OF CORRECTION

PATENT NO. : 7,189,667 B1
APPLICATION NO. : 09/554733
DATED : March 13, 2007
INVENTOR(S) : Leo Mans and Klaus-Dieter Hammer It is certified that error appears in the above-identified patent and that said Letters Patent is hereby corrected as shown below:

Column 6, line 26, should read (a) providing a mixture which includes cellulose dissolved in the Signed and Sealed this Twenty-fifth Day of November, 2008

JON W. DUDAS
*Director of the United States Patent and Trademark Office*